Patented Feb. 19, 1952

2,586,363

UNITED STATES PATENT OFFICE 2,586,363

VULCANIZABLE CHLOROSULFONATED POLYMERS

Ambrose McAlevy, Wilmington, Del., assignor to E. I. du Pont de Nemours & Company, Wilmington, Del., a corporation of Delaware No Drawing. Application May 19, 1947, Serial No. 749,100

4 Claims. (Cl. 260—79.3)

This invention relates to chlorosulfonated polymers and more particularly to certain novel uncured chlorosulfonated ethylene polymers in which the chlorine and sulfur contents are such that the said product has the properties of a high-quality synthetic rubber.

A process for preparing chlorosulfonated hydrocarbon polymers has been disclosed in the McQueen U. S. Patent 2,212,786 (cf. also Br. 542,414). According to the said process chlorine and sulfur dioxide are reacted simultaneously with olefin polymers; the resulting products contain combined chlorine, and also combined sulfur in the form of sulfonyl chloride groups. The patent states that satisfactory results were obtained by using from 1 to as high as 15 to 20 mols of sulfur dioxide per mol of chlorine, amounts of 3 to 6 mols of sulfur dioxide per mol of chlorine being preferred. In one of the embodiments (Example 2 of U. S. 2,212,786) polythene was employed as the olefin polymer and the sulfonyl chloride product obtained analyzed 3.8% sulfur and 18.8% chlorine. The chlorosulfonated polythene thus obtained was not rubber-like, and therefore differed in kind from the chlorosulfonated polythenes which are prepared in accordance with the present invention. The chlorosulfonated polymers of U. S. 2,212,786 are described as being useful in making tanning agents for leather, and applicable as fat liquoring agents, i. e. they had sufficiently high sulfur content to impart a surface-activating effect. There is no disclosure in the said patent of the rubbery form of chlorosulfonated polythene, or of chlorosulfonated polythene having a sufficiently low sulfur content to be of value as a vulcanizable elastomer. Thus, while the chlorosulfonated hydrocarbon polymers are broadly disclosed in the said patent, the specific new kind of chlorosulfonated polythene which is useful in the manufacture of synthetic rubbery materials is not suggested by the said broad disclosure.

An object of this invention is to provide an uncured, i. e. unvulcanized, synthetic rubbery product capable of being converted to a vulcanized rubbery material which does not have the undesirable characteristics of cured natural rubber (e. g. unsatisfactory aging properties, etc.). Other objects of the invention will appear hereinafter.

It has been discovered in accordance with this invention that rubbery, uncured, chlorosulfonated polymers can be prepared by chlorosulfonation of normally solid ethylene polymers, normally solid ethylene/vinyl chloride interpolymers and normally solid ethylene/vinylidene chloride interpolymers, and the like, provided the chlorine content of the resulting polymer is within the range of about 25 to 37%, the peak in rubber-like properties being within the range of 27 to 30%, and the sulfur content is within the range of 0.4 to 3.0%, with an optimum in curing properties at about 1.3 to 2.3% sulfur.

The rubbery chlorosulfonated polymers obtained in accordance with this invention contain polysulfonyl chloride groups. These chlorosulfonated polymers may be prepared by any suitable method such as by reacting the parent polymer with (1) $Cl_2+SO_2$, (2) $SO_2Cl_2$, or (3) $SO_2Cl_2+Cl_2$; by chlorinating the parent polymer and thereafter introducing the sulfonyl group by $SO_2+Cl_2$, $SO_2Cl_2$, $SO_2Cl_2+Cl_2$, etc. The introduction of chlorine and sulfonyl chloride groups may be accomplished in two or more stages if desired, e. g. the material treated in the final stage of the chlorosulfonation may be chloropolythene, or a chlorosulfonated polythene which is too low in sulfur content and/or chlorine content. Generally, but not invariably, the chlorosulfonation reaction is carried out in the presence of an inert organic liquid such as carbon tetrachloride. Artificial radiation may be employed to increase the efficiency of the chlorosulfonation reaction. Alternatively, the reaction may be conducted in the dark, and organic peroxides or other free radical producing substances may be employed as catalysts. Other methods for chlorosulfonating polythene are disclosed in U. S. 2,405,971. The chlorine content of the chlorosulfonated polymer can be predetermined from the weight of chlorine reacting, which is comparatively easy to measure. Control over the sulfur content of the product is somewhat more difficult, but, when $Cl_2+SO_2$ are employed as reactants, it can be achieved fairly well by employing an appropriate quantity of $SO_2$ and carrying out the reaction with $SO_2$ at a temperature below about 55° C., after some of the chlorine has already reacted. This results in a high percentage utilization of the $SO_2$ and thus permits fairly accurate control over the sulfur content of the product. In isolating the chlorosulfonated polymers from the reaction mixtures, it is generally desirable to remove the organic solvent (when one is used) by steam distillation and this may cause a partial hydrolysis of the sulfonyl chloride groups to sulfonic acid groups. This hydrolysis, if it occurs, has no substantial effect upon the vulcanizability of the chlorosulfonated polymers.

The chlorine content of the chlorosulfonated polymers determines the rubbery, i. e. elastic, properties to a very considerable extent. Chlorosulfonated polythene having a chlorine content below about 20% is somewhat waxy, and is tacky when warmed. The chlorosulfonated polythenes having relatively low chlorine contents closely resemble polythene itself. Within the range of about 20% to 45%, the chlorosulfonated polythenes are not wax-like, but have a rubbery character. This is especially true of the chlorosulfonated polymers having about 25 to 37% chlorine, the latter rubbery products being free of the stiffness which characterizes the chlorosulfonated polymers of higher chlorine content. At chlorine contents above 45% the chlorosulfonated polythenes are very stiff, and at relatively higher chlorine contents they are virtually inflexible and glass-like.

The sulfur content of the chlorosulfonated polythenes is highly critical, and must be within a comparatively narrow range if satisfactory vulcanizable rubber-like products are to be obtained. Chlorosulfonated polythenes having a sulfur content below 0.4% are substantially unvulcanizable in the absence of an agent for introducing new reactive centers. The chlorosulfonated polythenes having a sulfur content above about 3% do not yield satisfactory vulcanizates because, upon heating to curing temperatures, they overcure, i. e. yield products which are either substantially inflexible or are much less extensible and much less flexible than the rubber-like products obtained from the chlorosulfonated polythenes having less than about 3% of combined sulfur. Within the 0.4% to 3.0% range, the force required to stretch the cured polymer to a fixed percentage (e. g. 300%) varies almost linearly with the sulfur content. This permits the manufacture of "tailor-made" elastomers having predetermined elastic moduli.

The effects of changing the chlorine and sulfur contents of chlorosulfonated polythene are recorded in the following tables. The chlorosulfonated polythenes listed in Tables I and II were prepared by substantially the same procedure as is described in detail in Example 1, except that the quantity of chlorine and sulfur dioxide charged in each instance was sufficient to produce the stated contents of chlorine and sulfur.

TABLE I

Change in properties of vulcanizable chlorosulfonated polythene with variation in chlorine content

| Expt. No. | Chlorine Content | Sulfur Content | Remarks |
|---|---|---|---|
| 1 | 17.0 | 1.54 | Stiff, somewhat waxy. |
| 2 | 18.0 | 1.11 | Stiff, somewhat waxy; cured product cold draws. |
| 3 | 18.7 | 1.04 | Stiff, somewhat waxy; cured product cold draws. |
| 4 | 19.4 | 1.27 | Stiff, somewhat waxy; cured product cold draws. |
| 5 | 20.0 | 1.51 | Stretches, but tears easily; fair recovery after stretch; cured product cold draws. |
| 6 | 23.8 | 1.16 | Rubbery. |
| 7 | 24.6 | 1.66 | Rubberlike. |
| 8 | 28.0 | 1.33 | Do. |
| 9 | 30.6 | 1.51 | Do. |
| 10 | 36.3 | 1.50 | Do. |
| 11 | 40.1 | 2.72 | Stiff, somewhat rubbery. |
| 12 | 44.0 | 1.1 | Do. |
| 13 | 46.8 | 1.2 | Do. |
| 14 | 51.4 | 1.4 | Nearly inflexible, glassy plastic. |

TABLE II

Change in properties of chlorosulfonated polythene with variation in sulfur content

| Expt. No. | Chlorine Content | Sulfur Content | Remarks |
|---|---|---|---|
| 15 | 28.6 | 0.12 | Rubberlike, but fails to cure.[1] |
| 16 | 34.4 | 0.31 | Do. |
| 17 | 34.9 | 0.4 | Rubberlike, partially cures. |
| 18 | 34.0 | 0.72 | Rubberlike, cures satisfactorily. |
| 19 | 35.5 | 1.16 | Do. |
| 20 | 35.7 | 1.4 | Do. |
| 21 | 35.7 | 1.63 | Do. |
| 22 | 38.3 | 1.77 | Do. |
| 23 | 32.9 | 2.0 | Do. |
| 24 | 35.1 | 2.32 | Do. |
| 25 | 33.4 | 2.45 | Do. |
| 26 | 25.9 | 2.66 | Do. |
| 27 | 39.4 | 2.86 | Rubberlike, stiff, cures satisfactorily. |
| 28 | 36.3 | 2.92 | Rubberlike, cures satisfactorily. |
| 29 | 33.6 | 3.21 | Rubberlike, overcures. |
| 30 | 32.9 | 4.23 | Do. |
| 31 | 30.8 | 5.12 | Do. |
| 32 | 25.6 | 8.96 | Do. |

[1] The curing test was made by heating the chlorosulfonated polymer in a mold with one part Agerite Alba (a trade name for hydroquinone monobenzyl ether), 1 part Captax, (mercaptobenzothiazole) 10 parts wood rosin, 40 parts litharge at 120°–140° C. for 60 minutes.

An explanation for the existence of a critical range of sulfur content in the vulcanizable chlorosulfonated polythenes can be found by considering the effect of the sulfur content on the percentage of molecules having no or only one reactive group. If the variation of percent "unvulcanizables" i. e. molecules having no or only one reactive group ($-SO_2Cl$), as determmined by the percent sulfur for chlorosulfonated polythenes containing 30% Cl, is calculated, the following results are obtained. The calculations are based upon a polythene molecular weight of 12,000 prior to chlorosulfonation, but similar results are obtained when the calculation is based upon polythene molecular weights considerably higher than 12,000.

TABLE III

Effect of per cent S in chlorosulfonated polythene on the percentage of molecules having no or only one reactive group

| Per cent S (for polythene activated by $-SO_2Cl$) | Per cent S (for chloropolythene containing 30% Cl, activated by $-SO_2Cl$) | Average number of reactive groups per molecule | Per cent "Unvulcanizable," i. e. Molecules having no, or only one reactive group |
|---|---|---|---|
| 0.0 | 0.0 | 0.0 | 100 |
| 0.23 | 0.16 | 1.0 | 75 |
| 0.46 | 0.32 | 2.0 | 40 |
| 0.69 | 0.48 | 3.0 | 20 |
| 0.91 | 0.64 | 4.0 | 10 |
| 1.14 | 0.80 | 5.0 | 4 |
| 1.60 | 1.12 | 7.0 | 1 |

This table provides at least a partial explanation for the fact that pronounced changes in the nature of the cured product result from small changes in sulfur content, and shows further that at sulfur contents below 0.4% significantly large amounts of "unvulcanizable" resin are present. Thus at a sulfur content of 0.23% relatively few of the molecules are "vulcanizable," while at a sulfur content of 0.69% only relatively few molecules remain "unvulcanizable." It also appears that at sulfur contents which are so high that overcuring cannot be avoided the number of reactive groups per molecule is so excessive as to result substantially in immobility of the resin molecules.

The molecular weight of the polymer prior to introducing the substituent groups should be at least 10,000. Lower molecular weight polymers give soft, sticky, non-rubbery chlorosulfonated products which are not of the kind involved in the present invention. Polymers having molecular weights of about 10,000 to 25,000 are usually employed, but polymers having much higher molecular weights also may be used.

Methods for curing the chlorosulfonated polymers of this invention are described in detail in U. S. Patents 2,416,060 and 2,416,061.

While the preferred composition of the present invention is chlorosulfonated polythene, other closely related chlorosulfonated polymers (e. g. normally solid polymethylenes, such as those obtainable by hydrogenation of carbon monoxide or by decomposition of diazomethane), ethylene/vinyl chloride and ethylene/vinylidene chloride interpolymers also produces substantially equivalent results provided the chlorine content and the sulfur content are controlled so that they are within the same range as the chlorine and sulfur content of the preferred rubbery uncured chlorosulfonated polythenes. Accordingly the rubbery uncured chlorosulfonated ethylene/vinyl chloride and ethylene/vinylidene chloride interpolymers are included in the compositions contemplated by the present invention. The above-mentioned polymers, prior to chlorosulfonation, are, in general, soluble in toluene at the boiling point (111° C.).

The preparation of rubber-like vulcanizable chlorosulfonated polymers of the invention is illustrated further by means of the following examples.

Example 1.—Into a glass-lined reaction vessel equipped with a stirrer, an inlet tube under the stirrer, a reflux condenser, Pyrex windows for the admission of radiation from a type H4 lamp and a 300 watt tungsten filament lamp, and a jacket for the introduction of either steam or cold water, was introduced 97.3 pounds of carbon tetrachloride and 2.2 pounds of polythene having a molecular weight of about 12,000–18,000. Steam was injected into the jacket causing the carbon tetrachloride to boil. During the boiling of the carbon tetrachloride the mixture was stirred, and carbon dioxide was introduced through the inlet tube until all of the air in the system had been displaced. The lamps were then turned on and chlorine was introduced through the inlet tube. The temperature of the mixture at this stage was 77° C. The injection of steam was stopped, and the exothermic heat of the chlorination was removed by injection of cold water into the jacket. After 45 minutes the temperature of the chlorination mixture had dropped to 56° C. Sulfur dioxide was then introduced, while continuing the introduction of chlorine. This was continued for 95 minutes, the lowest temperature reached being 43° C. The introduction of sulfur dioxide was then stopped, but the introduction of chlorine was continued for 30 minutes more at a temperature of 53° to 70° C. The total weight of chlorine introduced was 2.0 pounds, and of sulfur dioxide, 0.117 pound. During the entire chlorination the exit gases were scrubbed with carbon tetrachloride, and the scrubber effluent was passed continuously into the chlorinator. The chlorosulfonated polythene in the product was recovered by injecting steam into the inlet tube and distilling over the carbon tetrachloride. The recovered wet resin was washed thoroughly with water and dried on a rubber mill. It closely resembled natural rubber in general appearance. It had a chlorine content of 30.0 and a sulfur content of 1.6%. The percentage utilization of the chlorine was 98.1% and of the sulfur dioxide, 88.2%. Similar results are obtained when the experiment is repeated using, in place of polythene, a high molecular weight polymethylene prepared in accordance with U. S. 2,352,328.

Example 2.—A solution containing 25 parts ethylene polymer, which has a molecular weight of 20,000–25,000, and 670 parts carbon tetrachloride is stirred rapidly at the boiling point of the solvent while 24.9 parts chlorine and 6.7 parts sulfur dioxide are bubbled into the mixture. A type H4 mercury vapor lamp is used to irradiate the reactants. After 21 minutes, during which time the temperature is allowed to drop to 40° C., the reaction is complete. Removal of the solvent is accomplished by steam distillation, following which the rubbery residue is washed with water to remove water-soluble acids. The polymer, after drying contained 27.6% chlorine and 2.76% sulfur.

Example 3.—One hundred twenty-five grams of chlorosulfonated polythene having a chlorine content of 34.9% and a sulfur content of 0.4% is dissolved in 2.5 liters of carbon tetrachloride, and the mixture is heated with 50 grams of $SO_2Cl_2$ for 120 minutes at 76° C. The product is freed of solvent and soluble acid by the action of steam, and the resulting rubber-like resin is dried on a rubber mill. It has a chlorine content of 34.0% and a sulfur content of 0.72%.

Example 4.—Twenty-five parts of an ethylene polymer having a molecular weight of 12,000–15,000 is dissolved in 800 parts of carbon tetrachloride in a Pyrex vessel at 77° C. To the solution is added 15 grams sulfuryl chloride (i. e., sulfuric oxychloride), and the mixture is stirred rapidly while being irradiated by means of a 300-watt tungsten filament incandescent lamp. Under these reaction conditions 30 grams of chlorine and 13 grams of sulfur dioxide are introduced over a period of one hour. The resinous product is then precipitated by adding a large excess of methanol, and the precipitate is washed several times with methanol. Finally the product is freed of volatile matter by drying in a vacuum oven at 50° C. This gives a rather stiff rubbery resin which contains 37.3% chlorine and 1.0% sulfur.

Example 5.—A solution containing 25 parts of a vinyl chloride-ethylene copolymer (chlorine content, 20%; molecular weight, 20,000–22,000) in 1200 parts of boiling carbon tetrachloride is treated with 15 parts of chlorine and 7 parts of sulfur dioxide under radiation from a 300-watt tungsten filament lamp. The product is precipitated by addition of methanol. After drying in a vacuum oven, it is found to contain 32.0% chlorine and 1.26% sulfur. A similar result is obtained by subjecting an ethylene/vinylidene chloride copolymer (chlorine content, 20%) to the same reaction conditions.

It is to be understood that any convenient method for vulcanizing the chlorosulfonated polymers of this invention may be employed, and that vulcanization methods other than those described in U. S. Patents 2,416,060 and 2,416,061 are effective in the preparation of cured elastomers from the products of the present invention. It has been discovered for example that these products may be cured by milling with certain inorganic salts such as salts of chromium, iron, zinc, etc. Moreover, it has also been discovered that curing of these products can be effected by the use of heat alone in the absence of catalysts or other curing aids. Furthermore, as disclosed in copending application of D. E. Strain, S. N. 579,317, filed February 22, 1945, these polymers can be cured by heating with an organic peroxide or other free radical producing substance.

It is to be understood that the chlorosulfonated polymers of the present invention contain substituent groups along the polymeric chain, and that the present invention is not concerned with low molecular weight materials which are not the said substituted polymers. Chlorinolysis of the polymer chain to low molecular weight substances is not encountered in the practice of the present invention.

The term "polythene," as employed herein, means those substantially linear polymers of ethylene which are per se suitable for use in plastics (Ind. Eng. Chem., 37, 596; British Patent 471,590; U. S. 2,153,553, 2,188,465, etc.).

Since many different embodiments of this invention may be made without departing from the spirit and scope thereof, it is to be understood that I do not limit myself except as set forth in the appended claims.

I claim:

1. A rubber-like, uncured chlorosulfonated polymer of the class consisting of normally solid ethylene polymer, normally solid polymethylenes, normally solid ethylene/vinyl chloride interpolymers, and normally solid ethylene/vinylidene chloride interpolymers, said chlorsulfonated polymer having a chlorine content of about 25% to about 37% by weight and a sulfur content of 0.4 to 3.0% by weight, said polymer prior to chlorosulfonation being soluble in toluene at 111° C. and having a molecular weight in excess of 10,000.

2. Rubber-like, uncured chlorosulfonated normally solid ethylene polymer having a chlorine content of 25% to 37% by weight and a sulfur content of 1.3 to 2.3% by weight said ethylene polymer prior to chlorosulfonation having a molecular weight in excess of 10,000.

3. Rubber-like, uncured chlorosulfonated ethylene/vinyl chloride interpolymer having a chlorine content of 25 to 37% by weight and a sulfur content of 0.4 to 3.0% by weight said ethylene polymer prior to chlorosulfonation having a molecular weight in excess of 10,000.

4. A rubber-like uncured chlorosulfonated normally solid ethylene/polymer having a chlorine content of 27 to 30% by weight and a sulfur content of 1.3 to 2.3% by weight said ethylene polymer prior to chlorsulfonation having a molecular weight in excess of 10,000.

AMBROSE McALEVY.

REFERENCES CITED

The following references are of record in the file of this patent:

UNITED STATES PATENTS

| Number | Name | Date |
|---|---|---|
| 2,212,786 | McQueen | Aug. 27, 1940 |
| 2,405,971 | McAlevy | Aug. 20, 1946 |
| 2,416,060 | McAlevy et al. | Feb. 18, 1947 |
| 2,416,061 | McAlevy et al. | Feb. 18, 1947 |

FOREIGN PATENTS

| Number | Country | Date |
|---|---|---|
| 542,414 | Great Britain | Jan. 8, 1942 |